(12) United States Patent
Nakahata

(10) Patent No.: US 7,072,087 B2
(45) Date of Patent: Jul. 4, 2006

(54) OPTICAL SCANNING APPARATUS

(75) Inventor: Hiroshi Nakahata, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 76 days.

(21) Appl. No.: 10/865,097

(22) Filed: Jun. 10, 2004

(65) Prior Publication Data

US 2004/0263933 A1    Dec. 30, 2004

(30) Foreign Application Priority Data

Jun. 13, 2003   (JP) ............................. 2003-169170

(51) Int. Cl.
*G02B 26/08*   (2006.01)
*B41J 27/00*   (2006.01)

(52) U.S. Cl. ..................... 359/204; 359/216; 347/243
(58) Field of Classification Search ..................... None
See application file for complete search history.

(56) References Cited

U.S. PATENT DOCUMENTS

| | | | | |
|---|---|---|---|---|
| 4,578,688 A | | 3/1986 | Okuno | 346/157 |
| 5,166,704 A | | 11/1992 | Yasuda | 346/108 |
| 6,304,282 B1 | | 10/2001 | Fujimoto | 347/242 |
| 6,381,057 B1 | | 4/2002 | Itabashi | 359/204 |
| 6,934,061 B1 | * | 8/2005 | Ono et al. | 359/204 |

* cited by examiner

*Primary Examiner*—James Phan
(74) *Attorney, Agent, or Firm*—Fitzpatrick, Cella, Harper & Scinto

(57) ABSTRACT

An optical scanning apparatus includes a rotatable polygonal mirror for deflecting first and second laser beams, which are incident on the polygonal mirror at diff(rent positions with respect to a rotational direction of the polygonal mirror; a first optical member for transmitting the first laser beam; a second optical member for transmitting the second laser beam; a laser beam blocking member, disposed between the first optical member and the second optical member, for blocking the first laser beam reflected by the first optical member to prevent the first laser beam reflected by the first optical member from being incident on the second optical member.

11 Claims, 7 Drawing Sheets

OPTICAL SCANNING APPARATUS

FIELD OF THE INVENTION AND RELATED ART

The present invention relates to an optical scanning apparatus preferably used as an exposing apparatus for an electrophotographic image forming apparatus such as a copying machine, a printer, etc. In particular, it relates to an optical scanning apparatus structurally enabled to block flare.

Referring to FIGS. 10–12, the background technologies from which the present invention was born will be described.

FIG. 10 is a drawing of an image forming apparatus which prints a color image. It comprises multiple image bearing members for yellow, magenta, cyan, and black colors, one for one (which hereinafter will be referred to as photosensitive member). A photosensitive drum comprises an electrically conductive substrate, and a photosensitive layer coated on the substrate. As the peripheral surface of a photosensitive member is exposed to a beam of laser light projected from an optical scanning apparatus, an electrostatic latent image is formed on the peripheral surface of the photosensitive member. In FIG. 10, a referential number 21 designates an optical scanning apparatus which projects a beam of laser light while modulating it with the image formation data transmitted from an unshown image reading apparatus, a personal computer, or the like, and a referential number 22 designates a developing device which forms a visible image of frictionally charged toner, on the peripheral surface of the photosensitive drum. A referential number 23 designates an intermediary transfer belt for conveying the aforementioned toner image on the photosensitive drum onto a piece of transfer paper, and a referential number 24 designates a sheet feeder cassette storing the sheets of transfer papers on which a toiler image is to be formed. A referential number 25 designates a fixing device which thermally fixes the toner image, which has just been transferred onto the transfer paper, to the transfer paper, and a referential number 26 designates a delivery tray onto which the transfer papers, onto which a toner image has just been fixed, are cumulatively discharged. A referential number 27 designates a cleaner for removing the toner remaining on the peripheral surface of the photosensitive drum.

The image formation process carried out by the above described image forming apparatus is as follows. First, a beam of light is projected from the optical scanning apparatus, while being modulated with the image formation data, onto the peripheral surface of the photosensitive drum charged by the charging device. As a result, an electrostatic latent image is formed on the peripheral surface of the photosensitive drum. Then, frictionally charged toner is adhered to the electrostatic latent image, forming thereby a visible image of toner, on the peripheral surface of the photosensitive drum, in the aforementioned developing device. The image formed of toner (which hereinafter will be referred to simply as toner image) is transferred from the photosensitive drum onto the intermediary transfer belt. Then, the toner image is transferred from the intermediary transfer belt onto a sheet of transfer paper delivered from the sheet feeder cassette located in the bottom portion of the main assembly of the image forming apparatus; an image is formed on the transfer paper. The toner image on the transfer paper is fixed to the transfer paper by the fixing device. Thereafter, the transfer paper is discharged into the delivery tray.

FIG. 11 is a drawing of the optical scanning apparatus of the image forming apparatus in FIG. 10. The optical scanning apparatus is symmetrical: its left-hand half is symmetrical to the right-hand half. Therefore, the referential symbols in the drawing designate only those on the right-hand half of the device. This optical scanning apparatus is of such a type that two beams of laser light are projected onto a single polygon mirror 28 from opposing directions, and the four photosensitive drums are exposed to four beams of exposure light E1–E4, one for one. It is of an oblique incidence type, and its second focal lenses are disposed so that the beams of laser light are transmitted through the second focal lenses after being separated. An oblique incidence optical system means such an optical system that in order to separate a beam of laser light into two beams of laser light, that is, top and bottom beams of laser light, after the original beam of laser light is deflected by a polygon mirror, two beams of laser light are projected so that they hit the reflective surfaces of the polygon mirror 1 at different angles relative to the referential plane in FIG. 12, in which the referential plane is the plane (X-Y plane in drawing) defined by the lines normal to the reflective surfaces of the polygon mirror and the rotational direction of the polygon mirror.

The two beams of laser light deflected by the polygon mirror 28 are transmitted through the first focal lens 29. The beam of laser light, which travels on the photosensitive drum side, is deflected downward toward the separative deflection mirror 31c. The two beams of laser light enter the first focal lens 29 at different angles. Therefore, a cylindrical lens is used as the first focal lens 29. Thus, focusing of the beams of laser light in terms of the direction parallel to the secondary scanning direction is done by the second focal lens 30 disposed in a manner to cover the paths of the two beams of laser light. The beam E-2 of the laser light travels downward, intersecting with the other beam of laser light. Then, it is transmitted through the second focal lens located between the deflection mirror 31c, and the deflection mirror 31b placed on the bottom surface of the housing of the optical scanning apparatus, and is deflected by the deflection mirror 31b. Then, it travels through the area next to the first focal lens, and reaches the peripheral surface of the photosensitive drum, exposing it. The beams E1 and E4 of laser light, which are projected onto the left end photosensitive drum and right end photosensitive drum, respectively, travel immediately below the separative deflection mirrors, one for one, travel through the second focal lens, and is deflected by the deflection mirror 31a, being thereby projected onto the peripheral surfaces of the photosensitive drums on the left- and right-hand ends, respectively. The separative deflection mirrors are positioned so that the fluxes of light do not become eclipsed due to the component tolerance, phase errors of the polygon mirror motor, and/or the like.

An optical scanning apparatus such as the above described one, however, suffers from the following structural problem. That is, each pair of optical components are symmetrically positioned relative to each other with respect to the polygon mirror. Therefore, the flares effected by the entrance plane of the first focal lens travel near the top and bottom surfaces of the polygon mirror, transmit through the first focal lens, which is located on the opposite side of the polygon mirror from the first focal lens that effected the flares, are deflected by the deflection mirror, and are projected onto the wrong photosensitive drum, causing image defects such as density anomaly. After each beam of laser light is deflected by the polygon mirror in an oscillatory fashion, it is deflected by the lenses by roughly 10% or less. Therefore, it has been a common practice to give the lenses such a treatment as coating. However, giving the lenses special coating or the like substantially adds to the cost of an optical scanning apparatus.

Moreover, giving the lenses antireflection coating does riot guarantee the elimination of flare; even if the lenses are given antireflection coating, there is the possibility that flares are effected by the lenses.

SUMMARY OF THE INVENTION

The primary object of the present invention is to provide an optical scanning apparatus of a multiple laser beam type, which is not affected by flare.

Another object of the present invention is to provide an optical scanning apparatus which is not affected by the flares effected by its optical system in which beams of laser light are deflected by the rotational polygonal mirror in the opposing directions in an oscillatory fashion.

Another object of the present invention is to provide an optical scanning apparatus comprising:

a rotational polygonal mirror for deflecting in an oscillatory fashion first and second beams of laser light which are different in the point at which they hit the polygonal mirror, in terms of the rotational direction of the polygonal mirror;

a first optical member through which the first beam of laser light is transmitted;

a second optical member through which the second beam of laser light is transmitted; and a first flare blocking member placed between the first and second optical members to block the portion of the first beam of laser light reflected by the first optical member, in order to prevent the portion of the first beam of laser light reflected by the first optical member from entering the second optical member.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Hereinafter, the preferred embodiments of the present invention will be described with reference to the appended drawings.

Figure 1:
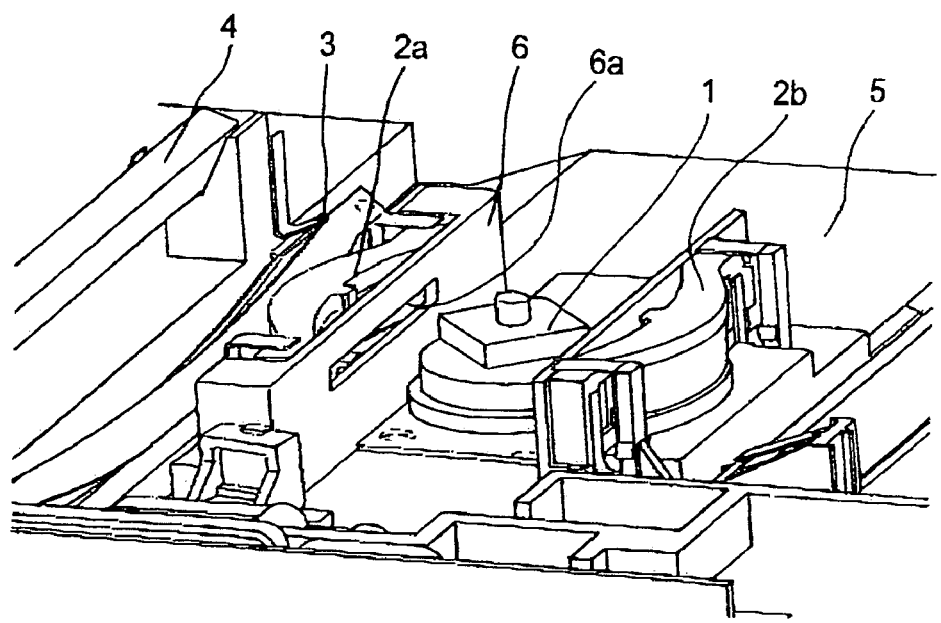
FIG. 1 is a drawing describing the optical scanning apparatus in the first embodiment of the present invention.

Shown in FIG. 1 is the polygon mirror, and its adjacencies, of the optical scanning apparatus in the first embodiment of the present invention.

Figure 10:
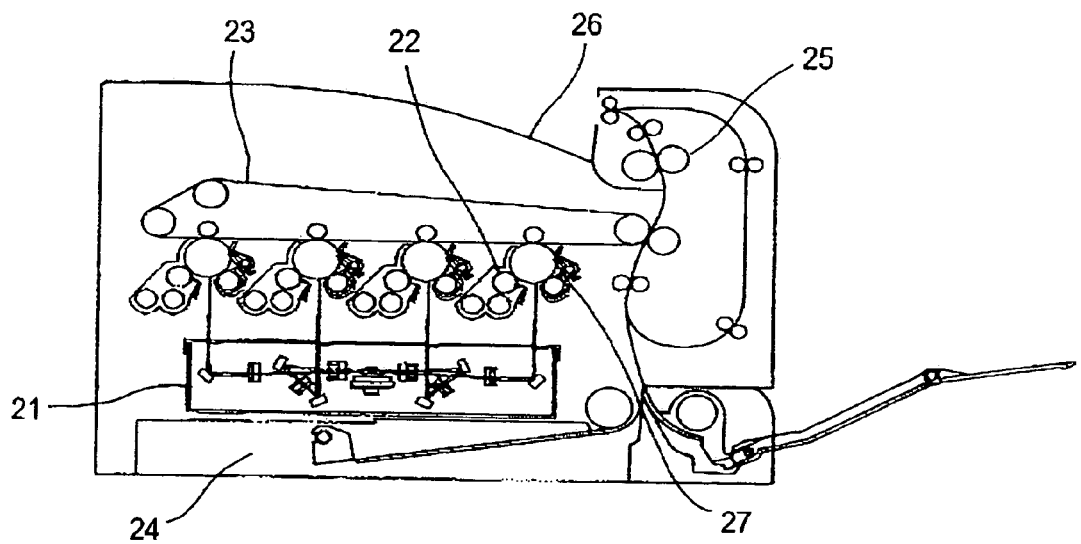
FIG. 10 is a drawing describing a typical image forming apparatus.
Figure 11:
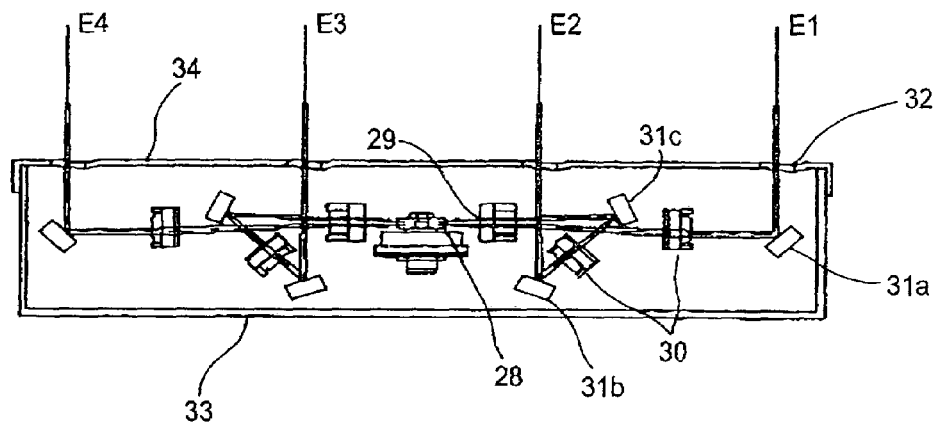
FIG. 11 is a drawing describing an optical scanning apparatus.
Figure 12:
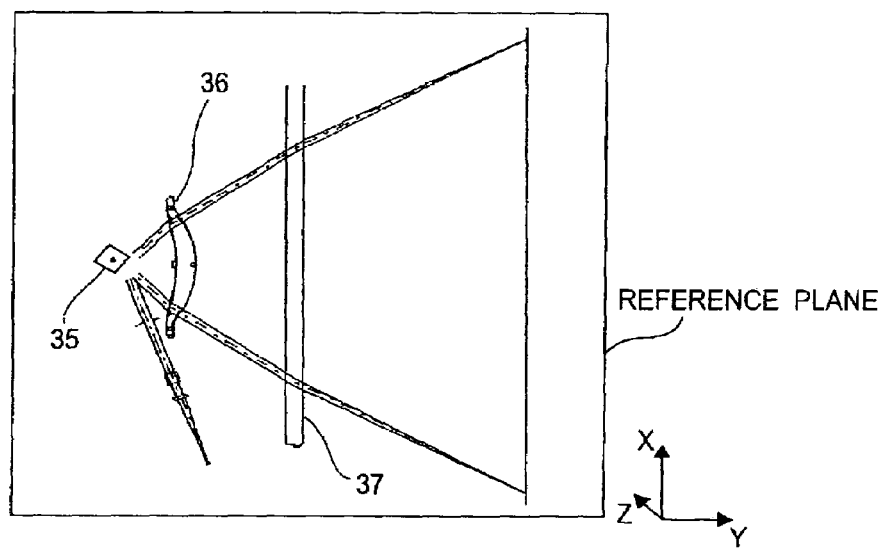
FIG. 12 is a drawing describing the referential plane of the optical scanning apparatus.

Referring to FIG. 10, the optical scanning apparatus in this embodiment is mounted in an image forming apparatus, and is capable of forming a latent image on the peripheral surface of the photosensitive rum by projecting a beam of laser light onto the peripheral surface of the photosensitive drum while modulating the beam of light with the image formation information.

The portions of the structure of the image forming apparatus other than the optical scanning apparatus will not be described here; for their description, the description of FIG. 10 is to be referred to.

Referring to FIG. 1, the optical scanning apparatus in this embodiment comprises a single polygon mirror having four reflective surfaces, that is, two pair of opposing two reflective surfaces. Thus, two pairs of beams of laser light, that is, a total of four beams of laser light, enter a pair of first focal lenses, two beams per lens, and expose four photosensitive drums, one for one.

In FIG. 1, a referential number 1 designates a polygon mirror (rotational multi-surface mirror) which deflects the beam of laser light projected from a laser, and referential symbols 2a and 2b designate first focal lenses which focus the beams of laser light into spots, on the peripheral surfaces of the photosensitive drums, one for one. A referential symbol 3a designates a second focal lens which focuses, along with the first focal lenses, the beam of laser light into a spot, on the peripheral surface of the photosensitive drum. The combination of the first and second focal lenses is called fθ lens. The first focal lenses 2a and 2b are used for making the two beams of laser light different in angle of incidence upon the polygon mirror. Therefore, they are cylindrical lenses which do not refract light, in terms of the secondary scanning direction.

Designated by a referential number 4 is a deflection mirror for reflecting in the predetermined direction the beam of laser light having transmitted through one of the aforementioned first focal lenses and designated by a referential number 5 is the housing of the optical scanning apparatus, by which various optical elements of the optical scanning apparatus are supported, or to which various optical elements of the optical scanning apparatus are fixed. Designated by a referential number 6 is a rib of the housing 5, which supports the first focal lens. The optical elements include first focal lenses 2a and 2b, second focal lens 3a, and defection mirror 4. The first focal lenses 2a and 2b constitute the first optical element, and the housing 5 constitutes an optical element holding member.

In this embodiment, four beams of laser light are projected from four unshown light sources located in the bottom portion of the drawing. Two of the four beams of laser light are deflected leftward by the polygon mirror 1 in an oscillatory fashion, and the other two are deflected rightward by the polygon mirror 1 also in the oscillatory fashion. Each beam of laser light is made oblique in incidence angle relative to the reflective surfaces of the polygon mirror 1. A after being deflected by the polygon mirror in an oscillatory fashion, one of the given set of two beams of laser light is transmitted through the first focal lens, and is deflected by the deflection mirror 4 in the direction parallel to the optical axis of the second focal lens 3, whereas the other is made to travel directly below the deflection mirror 4, and is deflected by the other deflection mirror (unshown) toward one of the photosensitive drums.

In the case of an optical scanning system such as the above described one, the beam of laser light is partially reflected (deflected) by the entrance surface of the first focal lens, is transmitted through the other first focal lens symmetrically disposed relative to the first focal lens which reflected the beam of laser light, with respect to the polygon mirror 1, and is projected onto the photosensitive drum which is not to be exposed by this beam of laser light, as in the case of the above described optical scanning apparatus in accordance with the prior art.

In this embodiment, therefore, this unwanted portion of the beam of laser light (which hereinafter will be referred to as flare) is blocked by providing the housing 5, which supports the first focal lens 2a, with a rib 6 having a slit 6a shown in FIG. 1. In this case, the rib 6 constitutes a flare blocking member. More specifically, the housing 5 is provided with the rib 6, and one of the surfaces of the rib 6 is used as the referential surface (positioning means) with which the first focal lens is placed in contact to accurately position the first focal lens. Therefore, it is unnecessary to provide the optical scanning apparatus with a dedicated flare blocking component. Moreover, with the interposition of no component, it is possible to improve the optical scanning apparatus in vertical measurement accuracy, making it easier to block the flare. In the drawing, the height h1 or the slit 6a is set to be the same as the thickness of the polygon mirror 1, because of the reason which will be discussed later.

Figure 2:
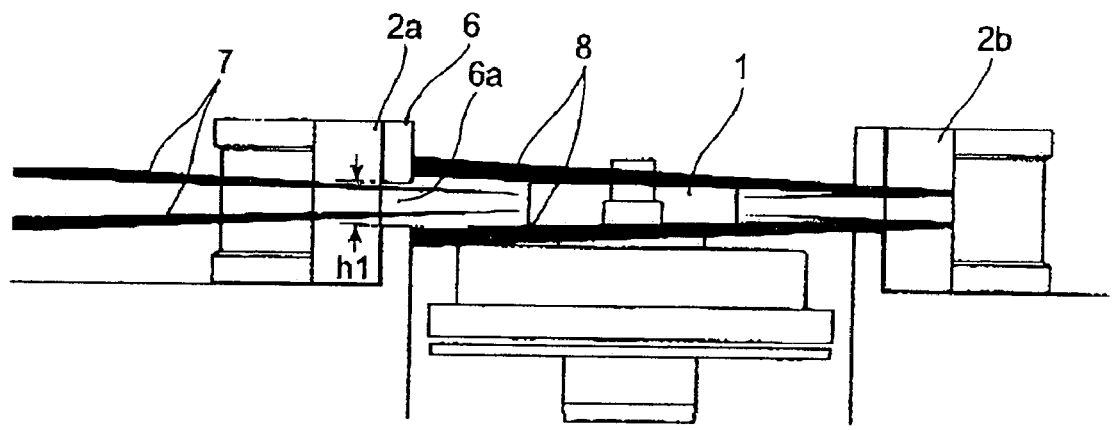
FIG. 2 is a sectional view of the optical scanning apparatus in the first embodiment of the present invention.

Next, the principle of flare blocking will be described with reference to FIG. 2, which is a sectional view of the portion of the optical scanning apparatus shown in FIG. 1. Designated by a referential number 7 in the drawing are beams of laser light deflected in an oscillatory fashion by the rotational polygon mirror, and designated by a referential number 8 are flares effected by the first focal lens 2b. FIG. 2 shows neither the beams of laser light deflected rightward in an oscillatory fashion, nor the flares effected by the first focal lens 2a. In this embodiment, the flares, which resulted as the beams of laser light are partially reflected (deflected) by the entrance surface of the first focal lens 2b, are blocked by the rib 6 of the housing 5, which supports the first focal lens 2a symmetrically positioned relative to the fist focal lens 2b with respect to the polygon mirror 1. As will be evident from FIG. 2, setting the incidence angle of the beam of laser light to be larger makes it possible to better prevent the flares from entering the lens. However, from the standpoint of focus, it is disadvantageous to set the entrance angle to be larger. The flares travel toward the first focal lens 2a, which is on the opposite side of the polygon mirror 1 from the first focal lens 2b, after being reflected (deflected) by the first focal lens 2b, as shown in FIG. 2. Therefore, the flares are different in height from the beams of laser light deflected in an oscillatory fashion by the first focal lens 2a, although roughly the same in angle. Thus, the flare blocking rib 6 has only to be set up so that it allows the beams of laser light deflected in an oscillatory fashion by the first focal lens 2a, to pass through the slit 6a of the rib 6, but blocks the flares effected by the first focal lens 2b.

Figure 3:
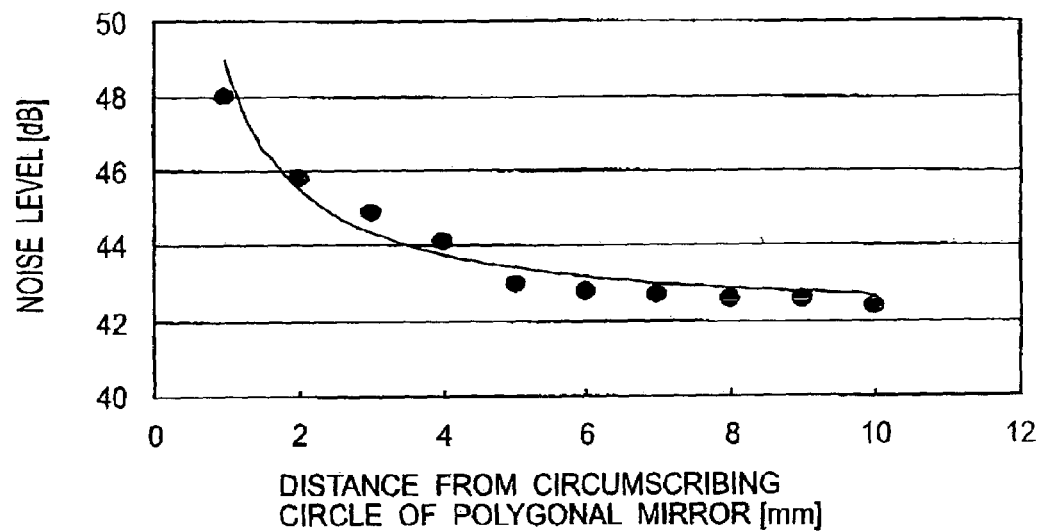
FIG. 3 is a graph for describing the characteristic of the optical scanning apparatus in the first embodiment of the present invention, in terms of noises.

However, when placing a rib in the adjacencies of the polygon mirror 1, it is necessary to pay attention to the increase in noises, in particular, whistling sounds. More specifically, the polygon mirror 1, or an polygonal object rotates at a high speed. Therefore, if such a wall as a rib is present next to the polygon mirror 1, noises are generated by the fluctuation in the pressure between each corner of the polygon mirror 1 and rib 6, tending to add to the operational noises. FIG. 3 shows the relationship between the distance from the circumscribing circle of the polygon mirror 1 to the rib 6, and the amount of the whistling sounded generated by the polygon mirror 1. In this case, the bottom edge of the slit 6a of the rib 6 is the same in height as the bottom surface of the polygon mirror 1. It is evident from FIG. 3 that the closer the rib 6 to the polygon mirror 1, the higher the noise level, and also, that when the rib 6 is placed no less than roughly 5 mm away from the polygon mirror 1, the presence of the rib 6 has little effect upon the noise level.

When the height of the slit 6a of the rib 6 is no less than the thickness of the polygon mirror 1, the effect of the presence of the rib 6 upon the noise level is substantially smaller than otherwise. Therefore, as long as the flares can be blocked, the height of the slit 6a of the rib 6 may be greater than the thickness of the polygon mirror 1. Further, it is unnecessary to symmetrically place another rib similar in configuration, with respect to the polygon mirror 1.

Further, in the case of an optical scanning apparatus structured, unlike the optical scanning apparatus in this embodiment, so that each pair of beams of laser light become asymmetrical with respect to the optical axis of each lenses, that is, one of each pair of beams of laser light is different in incidence angle from the other, only the portion of the rib 6 above or below the slit 6a has to be provided.

Figure 4:
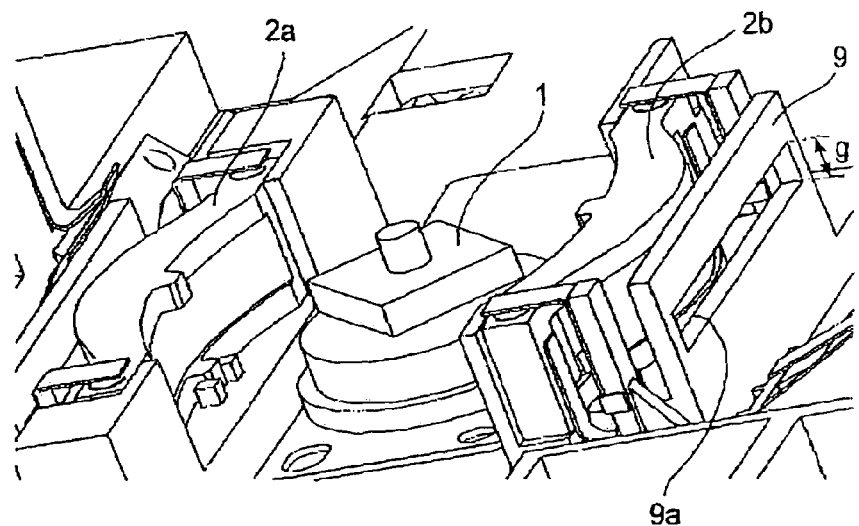
FIG. 4 is a drawing describing the optical scanning apparatus in the second embodiment of the present invention.

Regarding the variation of the first embodiment, when the first focal lenses are very close to the polygon mirror 1, or it is configurationally difficult to place the rib 6 so that the slit 6a is positioned as shown in FIG. 1, a flare blocking plate 9 having a slit 9a may be placed behind the first focal lens 9b as shown in FIG. 4. This structural arrangement also provides the same effect as that realized by the first embodiment (In FIG. 4, the flare blocking rib 9 is placed next to the first focal lens 2b, for the ease of description. Obviously, however, the flare blocking plate 9 may be placed next to the first focal lens 2a). In this case, it is unnecessary that the height of the slit 9a is to be set according to the thickness of the polygon mirror 1; the height g of the slit 9a may be optionally set. As described above, this embodiment of the present invention makes it possible to block the flares without affecting the noise generated by the polygon mirror 1.

(Embodiment 2)

Figure 5:
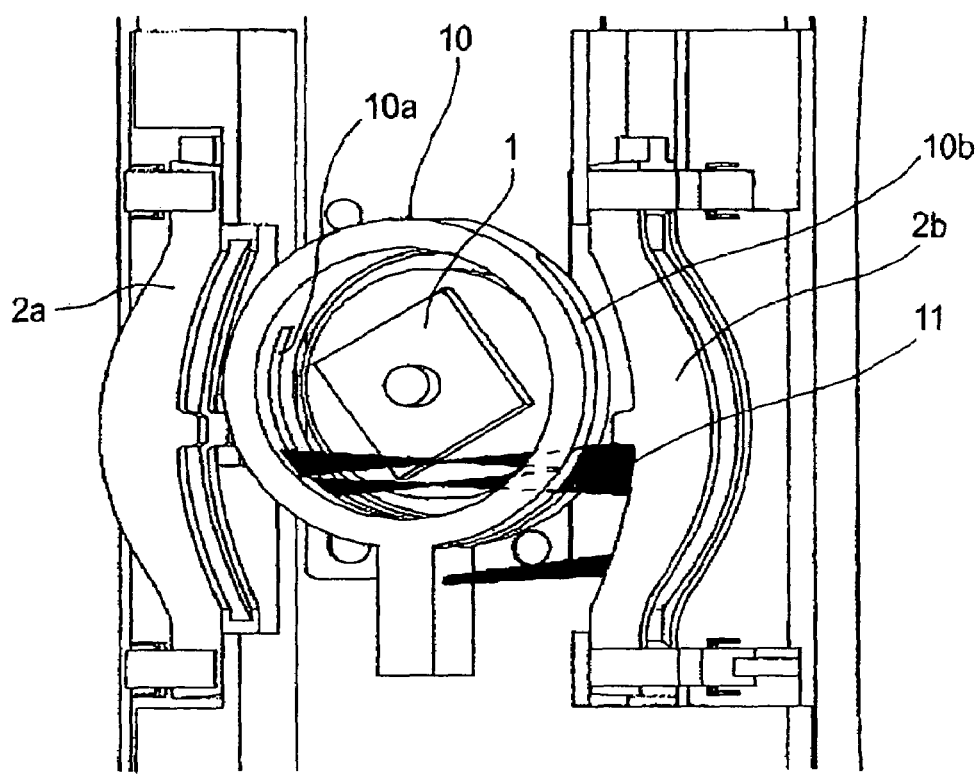
FIG. 5 is a drawing describing the flares in the optical scanning apparatus in the second embodiment of the present invention.
Figure 6:
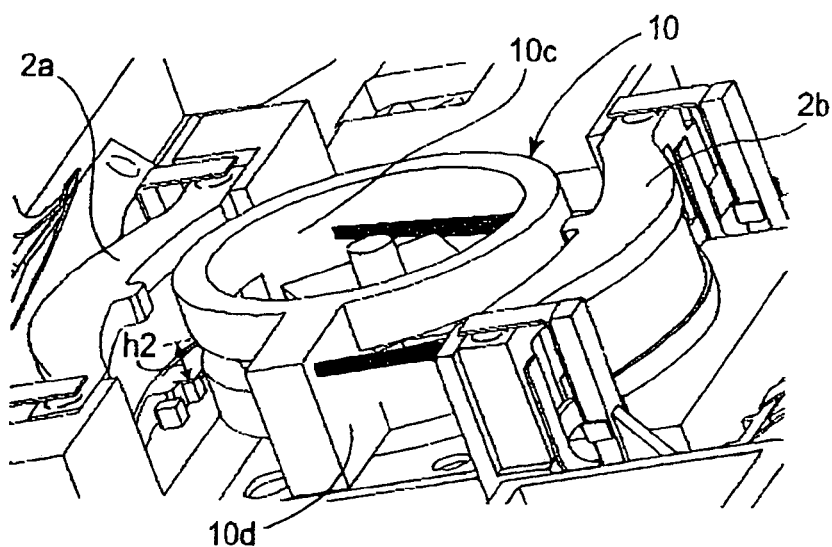
FIG. 6 is a drawing describing the flares in the optical scanning apparatus in the second embodiment of the present invention.
Figure 7:
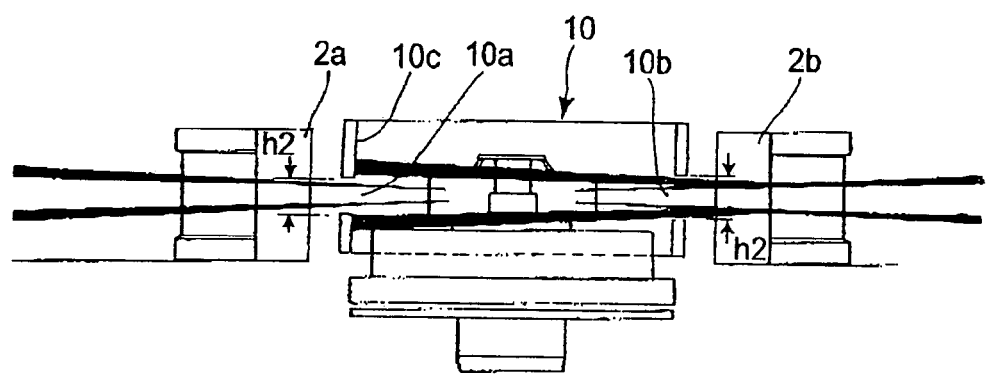
FIG. 7 is a sectional view of the optical scanning apparatus in the second embodiment of the present invention.

Referring to FIGS. 5–7, the second embodiment of the present invention will be described. The portions of the optical scanning apparatus in the second embodiment, which are the same as those in the first embodiment will not be described. Designated by a referential number 10 is a circular rib attached to the unshown lid of the optical scanning apparatus. The circular rib 10 is provided with an entrance through which beams of laser light are projected from a light source onto the polygonal mirror 1, and slits 10a and 10b through which the beams of laser light deflected in an oscillatory fashion by the polygon mirror 1 are allowed to travel toward the first focal lenses 10a and 10b, respectively. Designated by a referential number 11 is the flares effected by the entrance plane of the first focal lens 2b positioned on the right-hand side of the drawing. FIGS. 5–7 show only the flares effected by the lens on the right-hand side; they do not show the beams of laser light deflected in an oscillatory fashion by the polygon mirror 1, and the flares effected by the lens on the left-hand side, as shown in FIG. 2, which depicts the first embodiment of the present invention. The heights h2 of the slits 10a and 10b of the circular rib 10 in this embodiment are the same as the thickness of the polygon mirror 1. The axial line of the circular rib 10 coincides with the axial line of the polygon mirror 1. In this embodiment, the circular rib 10 constitutes the flare blocking member.

Referring to FIGS. 6 and 7, the flares effected by the entrance plane of the first focal lens 2b, which is on the right-hand side in the drawing, travel through the slit 10b of the circular rib 10, but are blocked by the portions 10c of the rib 10, which are on the opposite side of the polygon mirror 1 from the first focal lens 2b. The flares effected (deflected) by the edge portions of the lens travel through the areas substantially away from the polygon mirror 1 Therefore, what is necessary to block the flares is either to increase the diameter of the circular rib 10, or to provide the circular rib 10 with a rib 10d, which extends from the circular rib 10 in the radius direction of the circular rib 10. In this embodiment, the heights of the slits 10a and 10b of the circular rib 10 are the same as the thickness of the polygon mirror 1. Therefore, the fluctuation of the pressure between the polygon mirror 1 and rib 10, which is caused by each of the corner portions of the polygon mirror 1, is relatively small. Therefore, the whistling noises resulting from the rotation of the polygon mirror 1 are less likely affected by the presence of the rib 10.

The portion of the circular rib 10 above the slits 10a and 10b may be constructed as a part of the top lid of the optical scanning apparatus, and the portion of the circular rib 10 below the slits 10a and 10b may be constructed as a part of the housing 5 of the optical scanning apparatus. The effects of such a structural arrangement are the same as those in this embodiment. In other words, the housing 5 and lid constitute the optical element holding bottom and top members, respectively, and the rib, with which the lid is provided, constitutes the first structural portion of the flare blocking member, and the rib, with which the housing 5 is provided, constitutes the second structural portion of the flare blocking member. In this case, the top and bottom ribs may be different in diameter as long as their axial lines coincide with each other; their effects are the same as those when they are the same in diameter. Further, the circular rib may be formed independently from the lid, and attached to the housing 5. Obviously, the effects of such a structural arrangement are the same as those in this embodiment. As described above, not only does this embodiment of the present invention can block the flares, but also, can prevent the polygon mirror 1 from generating whistling sound.

(Embodiment 3)

Figure 8:
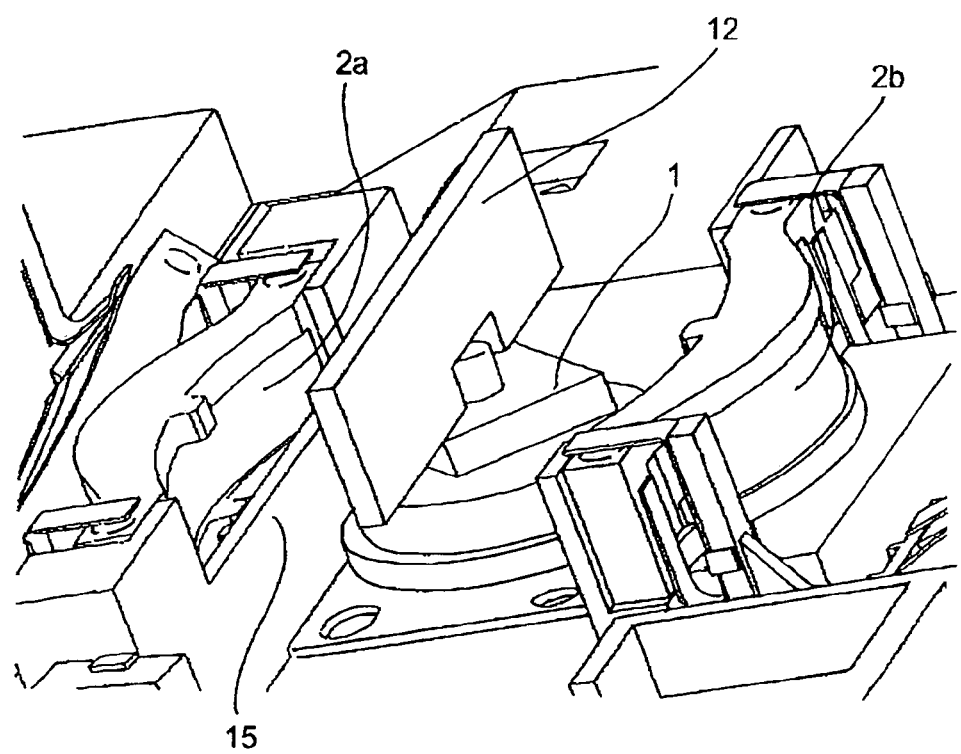
FIG. 8 is a drawing describing the optical scanning apparatus in the third embodiment of the present invention.
Figure 9:
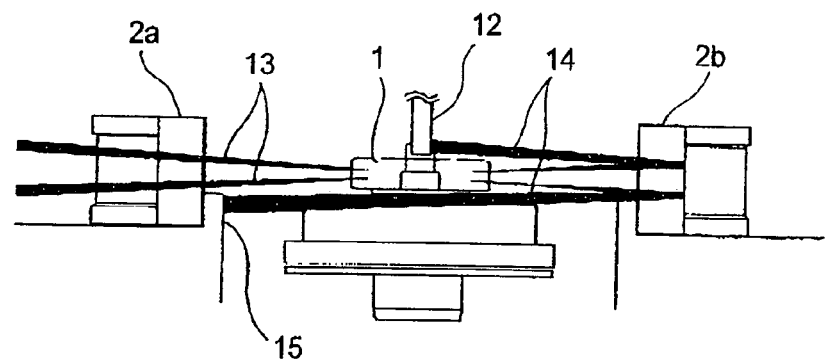
FIG. 9 is a drawing describing the flares in the optical scanning apparatus in the third embodiment of the present invention.

Referring to FIGS. 8 and 9, the third embodiment of the present invention will be described. The portions of the optical scanning apparatus in this embodiment, which are the same as those in the first and second embodiments, will not be described. Designated by a referential number 12 is a rib (flare blocking member), with which unshown lid of the optical scanning apparatus is provided. This rib 12 (flare blocking member) is located directly above the polygon mirror 1. The rib 12 is shaped so that it can be positioned as close as possible to the top surface of the polygon mirror 1 without interfering with the motional components such as the rotational axle of a motor.

Generally, in the case of an optical scanning apparatus (optical system) of an oblique incidence type, the first focal lenses 2a and 2b are cylindrical lenses which are not capable of refracting light in the direction parallel to the secondary scanning direction of the apparatus Therefore, as the fluxes of laser light travel toward the second focal lenses 3a and 3b, they radially expands in the direction parallel to the secondary scanning direction until they enter the second focal lens 3a and 3b. Therefore, in the case that the flare blocking rib is substantially away from the polygon mirror 1, the flares sometimes overlap with the beams of laser light deflected in an oscillatory fashion by the polygon mirror 1, between the flare blocking rib and polygon mirror 1, making it impossible to block only the flares. Thus, when the angle of incidence is relatively large, or the first focal lenses 2a and 2b are substantially away from the polygon mirror 1, the structural arrangement in this embodiment is recommendable as the means for minimizing, while satisfactorily blocking the flare, the possibility that the whistling sound generated by the polygon mirror 1 will be increased by the presence of the flare blocking rib.

In this embodiment, the flare blocking rib 12 is directly above the polygon mirror 1. In other words, the optical scanning apparatus in this embodiment is not structured so that as the polygon mirror 1 rotates, the pressure between the polygon mirror 1 and flare blocking rib 12 fluctuates. Therefore, it does not need to be concerned that the presence of the flare blocking rib 12 increases the amount of the whistling sound generated by the rotation of the polygon mirror 1. Referring to FIG. 9, designated by a referential number 13 are the beams of laser light deflected in an oscillatory fashion by the polygon mirror 1, and designated by a referential number 14 are the flares effected by the first focal lens 2b, which is on the right-hand side of the drawing. FIG. 9 does not show the beams of laser light deflected rightward of the drawing by the polygon mirror 1 and the flare effected by the first focal lens 2a. In the case of this structural 10 arrangement, the flare directed toward the area above the polygon mirror 1 is blocked by the flare blocking rib 12 positioned immediately above the polygon mirror 1, whereas the flare direct toward the area below the polygon mirror 1 is blocked by the portion 15 which supports the first focal lens 2a.

In this case, as long as the optical scanning apparatus is structured so that the flare which is directed toward the area below the polygon mirror 1 does not overlap with the beams of laser light deflected in an oscillatory fashion by the polygon mirror 1, there is no need for the restriction regarding the positioning of the flare blocking rib, and it is unnecessary for the pair of flare blocking ribs to be symmetrically formed and positioned relative to each other with respect to the polygon mirror 1. Obviously, the flare blocking rib may be formed independently from the lid, and attached to the housing 5; the effects of such a structural arrangement are the same as those in this embodiment. As described above, this embodiment of the present invention can block the fares without affecting the whistling sound generated by the polygon mirror 1.

As described above, according to the present invention, it is assured that the effects of the flares generated in an optical system, in which multiple beams of light are deflected in an oscillatory fashion, in opposing two directions, by a rotational polygonal mirror, are eliminated.

While the invention has been described with reference to the structures disclosed herein, it is not confined to the details set forth, and this application is intended to cover such modifications or changes as may come within the purposes of the improvements or the scope of the following claims.

What is claimed is:

1. An optical scanning apparatus comprising:
   a rotatable polygonal mirror for deflecting first and second laser beams, which are incident on said polygonal mirror at different positions with respect to a rotational direction of said polygonal mirror;
   a first optical member for transmitting the first laser beam;
   a second optical member for transmitting the second laser beam; and
   a first laser beam blocking member, disposed between said first optical member and said second optical member, for blocking the first laser beam reflected by said first optical member to prevent the first laser beam reflected by said first optical member from being incident on said second optical member.

2. An apparatus according to claim 1, wherein said first laser beam blocking member is disposed between said polygonal mirror and said second optical member.

3. An apparatus according to claim 2, wherein a distance between said first laser beam blocking member and said polygonal mirror is not less than 5 mm.

4. An apparatus according to claim 2, further comprising a second laser beam blocking member, disposed between said polygonal mirror and said first optical member, for blocking the second laser beam reflected by said second optical member to prevent the second laser beam reflected by said second aperture member from being incident on said first optical member.

5. An apparatus according to claim 4, wherein said first and second laser beam blocking members are integral with each other.

6. An apparatus according to claim 1, wherein said first laser beam blocking member includes a slit for permitting the second laser beams to pass toward said second optical member.

7. An apparatus according to claim 1, wherein said first and second laser beams are incident on said polygonal mirror in directions crossing with a rotational plane of said polygonal mirror.

8. An apparatus according to claim 7, wherein said first and second laser beams are crossed with the rotational plane of said polygonal mirror in opposite directions.

9. An apparatus according to claim 1, wherein the first laser beam and the second laser beam are incident on opposite surfaces of said polygonal mirror.

10. An apparatus according to claim 9, wherein said first optical member and said second optical member are disposed at positions substantially symmetrical with respect to a rotational center of said rotatable polygonal mirror.

11. An electrophotographic apparatus comprising:
    a scanning optical apparatus according to claim 1, which emits first and second laser beams; and
    first and second photosensitive members;
    wherein said first photosensitive member is imagewisely exposed tote first laser beam, and said second photosensitive member is imagewisely exposed to the second laser beam.

* * * * *

UNITED STATES PATENT AND TRADEMARK OFFICE
CERTIFICATE OF CORRECTION

PATENT NO. : 7,072,087 B2
APPLICATION NO. : 10/865097
DATED : July 4, 2006
INVENTOR(S) : Hiroshi Nakahata It is certified that error appears in the above-identified patent and that said Letters Patent is hereby corrected as shown below:

COLUMN 1
      Line 37, "toiler" should read --toner--.

COLUMN 2
      Line 19, "mirror 1" should read --mirror 28--.

COLUMN 3
      Line 5, "riot" should read --not--.

COLUMN 4
      Line 17, "rum" should read --drum--;
      Line 51, "lenses" should read --lenses,--; and
      Line 59, "defection" should read --deflection--.

COLUMN 5
      Line 2, "A" should be deleted;
      Line 3, "after" should read --After--;
      Line 35, "or" should read --of--; and
      Line 51, "fist" should read --first--.

COLUMN 6
      Line 11, "sounded" should read --sounds--; and
      Line 31, "lenses," should read --lens,--.

COLUMN 8
      Line 8, "lens" should read --lenses--;
      Line 38, "10" should be deleted;
      Line 41, "direct" should read --directed--; and
      Line 57, "fares" should read --flares--.

COLUMN 9
      Line 30, "aperture" should read --optical--.

UNITED STATES PATENT AND TRADEMARK OFFICE
CERTIFICATE OF CORRECTION

PATENT NO. : 7,072,087 B2
APPLICATION NO. : 10/865097
DATED : July 4, 2006
INVENTOR(S) : Hiroshi Nakahata It is certified that error appears in the above-identified patent and that said Letters Patent is hereby corrected as shown below:

COLUMN 10
      Line 23, "a scanning optical" should read --an optical scanning--; and
      Line 27, "tote" should read --to the--.

Signed and Sealed this

Twenty-fourth Day of April, 2007

JON W. DUDAS
*Director of the United States Patent and Trademark Office*